US005338066A

United States Patent [19]

Gundjian

[11] Patent Number: 5,338,066

[45] Date of Patent: Aug. 16, 1994

[54] METHOD AND SECURITY SUBSTRATE FOR PROTECTING AGAINST DUPLICATION WITH A COLOR COPIER

[75] Inventor: Arshavir Gundjian, Montreal, Canada

[73] Assignee: Nocopi International Ltd., Wayne, Pa.

[21] Appl. No.: 861,712

[22] Filed: Apr. 1, 1992

[51] Int. Cl.[5] .......... B42D 15/00; B32B 3/00

[52] U.S. Cl. .......... 283/67; 283/95; 283/902; 428/207; 428/333; 428/531; 428/915; 428/916; 503/201

[58] Field of Search .......... 428/915, 916, 207, 333, 428/531; 503/201; 283/902, 67, 95

[56] References Cited

U.S. PATENT DOCUMENTS 4,846,502 7/1989 Chang .......... 283/95
4,867,481 9/1989 Gundjian .......... 428/916 X

FOREIGN PATENT DOCUMENTS 0353974A 2/1990 European Pat. Off. .......... 428/916
3115142 11/1982 Fed. Rep. of Germany .......... 428/916
3905155 8/1990 Fed. Rep. of Germany .......... 428/916
2565268 12/1985 France .......... 428/916
0006113 2/1982 Japan .......... 428/916

*Primary Examiner*—P. C. Sluby
*Attorney, Agent, or Firm*—Sprung Horn Kramer & Woods

[57] ABSTRACT

A method for protecting against duplication of a document with a color copier and a security substrate comprises providing a background color on a document having an average reflectance value and printing on the background with a contrast color having a spectral characteristic which modulates the average reflectance value by no more than 5% and has an average value equal to the average reflectance value. The contrast color is printed with a printing medium including one of a colorformer leucodye and an activating phenolic resin. The other of the colorformer leucodye and the activating phenolic resin is to the printing medium on the document later to verify that the document is an original.

2 Claims, 1 Drawing Sheet

METHOD AND SECURITY SUBSTRATE FOR PROTECTING AGAINST DUPLICATION WITH A COLOR COPIER

BACKGROUND OF THE INVENTION

The advent of color copiers and the tremendous improvements recently achieved in the visual quality of copies produced by such photocopiers has opened up a new area of major concern in the fight against the fraudulent duplication and counterfeiting of valuable documents.

The almost daily reported cases of fraudulently color copied admission tickets to major events, securities and high face value redeemable coupons are only a few samples of a very large problem.

The prior art provides a technology where the background of an original document is printed by a complex combination of multicolor screens where a statement such as VOID or COPY is "hidden" to the casual visual scrutiny and upon copying, the screens that carry the hidden words become more prominent and hence the latter become visible to reveal the copied nature of the document. It is important to note that the Standard Register patent relies on the "revelation" of a "hidden" information. This has an inherent weakness which results from the obvious ease with which the "revealed" information can always be erased or inhibited through successive copyings. As a matter of fact it is currently known in the printing trade that while on the one hand the successful provision of a "Standard Register" prescribed background on the original is rather difficult, on the other hand the inhibition of the revealable messages on the copy is relatively easy.

As distinctly opposed to the above described situation, the present invention consists of placing on the original document, through any one of the presently known printing processes, background information which is visually perceptible and readable, but which upon color copying will be washed away thus alarming the user by its absence.

SUMMARY OF THE INVENTION

The present invention provides a relatively simple, but most importantly, a very effective technology that results in a radical solution to this problem.

Furthermore, this technology is completely compatible with all known printing systems and is, therefore, particularly suitable for the protection of documents, labels and other printed vehicles against duplication on color copiers.

The central concept of this invention is to impart to the background of a document a carefully specified optochemical dual characteristic of which neither the optical nor the chemical components can be duplicated by a color copier. Actually, the very high security provided by this technique consists in the fact that when the operator fraudulently using the color copier tries to obtain at best a visual duplication of the document, the presently disclosed technique will render the copy easily identified by a legitimate examiner and hence will induce the latter to proceed to the simple chemical verification steps where the copy will invariably fail, since the copier is naturally completely incapable of reproducing any chemical feature from the original.

These and other objects and advantages are achieved in accordance with the present invention by a method for protecting against duplication of a document with a color copier, comprising the steps of providing a background color on a document having an average reflectance value and printing on the background with a contrast color having a spectral characteristic which modulates the average reflectance value by no more than 5% and has an average value equal to the average reflectance value. The step of printing the contrast color comprises printing with a printing medium including one of a color former leuco dye and an activating phenolic resin and method further comprises applying the other of a color former leuco dye and an activating phenolic resin to the printing medium on the document to verify that the document is an original.

The invention is also directed to a security substrate for protecting against duplication with a color copier, comprising a background color on one main surface having an average reflectance value and a contrast color on the background color having a spectral characteristic which modulates the average reflectance value by no more than 5% and has an average reflectance equal to the average reflectance value. The contrast color is composed of a printing medium including one of a color former leuco dye and an activating phenolic resin, which can be activated by the other of the two to verify originality.

The present invention will be discussed with reference to the attached drawing wherein:

DETAILED DESCRIPTION OF THE INVENTION

Figure 1:
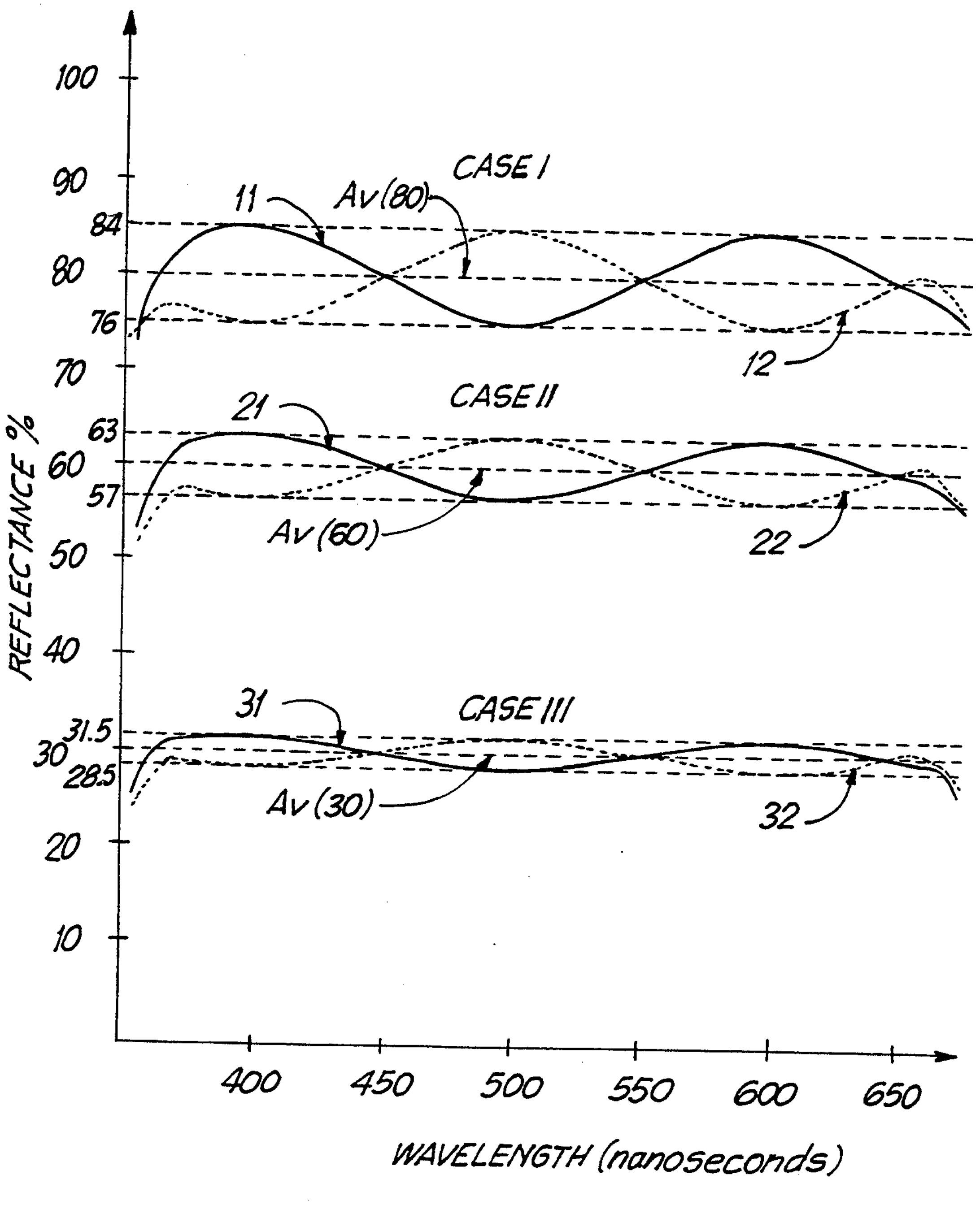
FIG. 1 is a graph of the optical characteristics of the present invention.

The objective of the present invention is to tailor the optical characteristics such that they appear as visually clearly identifiable elements on the original document and that they then disappear or at best, are completely distorted after color copying and hence through their absence or visual distortion reveal that a copying process has taken place.

A color copier reproduces the colored information from a document by identifying the spectral components of the image pixel to be duplicated and by reproducing as closely as possible the same spectral components on the copy paper by mixing proportionated quantities of colored toners, or in other cases, color developers, that will result in a reasonable replica of the original color.

The present invention takes advantage of the substantial difference in the dynamic range of the copier considered as a sensor of spectral characteristics compared to the human eye. Specifically, it has been determined that while the human eye can easily discern a ±(2 to 5)% modulation in the spectral reflection characteristic of a substrate, the color copiers dynamic range sensitivity is less than half of the above range, thus, up to about a 10% variation in the spectral characteristic is averaged out to zero by the copier.

The present invention, therefore, prescribes the color of the copy vanishing information to be as shown in FIG. 1. Three different cases are described in FIG. 1. In each case, an average reflectance (Av), corresponds to the prescribed overall reflectance of the background of the original document. Thus, in case I, Av(80) corresponds to an essentially white general background color; in case II, Av(60) corresponds to a perceptibly grey background color; and in case III, Av(30) corresponds to a relatively dark grey background color.

The information to be printed on the above described backgrounds has a spectral characteristic in each case given typically by the curves 11, 12, 21, 22 and 31, 32. Actually any spectral characteristic that modulates the chosen average with a modulation amplitude that is within 5% of the average (Av), can be adopted. These characteristics will actually visually correspond to describable shades. Thus as in case I, the general impression left by 12 will be a light green, the impression left by 11 will be a light pink or purple. Other modulations within 5% (between 76 to 84%) would result in light brown, yellow, etc. colors. In case II, the general background is a light grey and the impression left by 22, 21 and other modulations of the average within 5% (between 57 to 63%) will be a slightly green shaded grey, pink or purple shaded grey, brown shaded grey, etc. In case III, the general background is a dark grey and the impression left by 32, 31 and other modulations of the average within 5% (between 28.5 to 31.5%) will be a very slightly green shaded or a very slightly purple shaded grey.

The key element in every one of the above described cases is to ensure that the average reflectance of the general background and the average of the modulation shade are practically equal. Notice, therefore, that while in case I the information is essentially printed over an essentially white background, in cases II and III it is necessary to separately print the background and the information with proper relative registering. Indeed, when the average reflectivity is less than around 80%, i.e. the background is grey, any straight overprinting will result in a lower average reflectance which is not acceptable in this process. A further observation is that since the allowed depth of modulation of the average is a maximum of 5% of the average, it is clear that the visual contrast of colors 11 or 12, 21 or 22 and 31 or 32 against the respective backgrounds, will be less and less as the average goes lower, i.e. the contrast of colors such as 11 or 12 against the background is proportional to the average-reflectance.

Now when a document prepared according to the above prescription is placed on a color copier, it is clear that because of the limited dynamic range of the machine, colors 11, 12, 21, 22, 31 and 32 will be reproduced only as their average value, which being coincident with the background reflectance, the copy will show a zero contrast between the copy of the general background and the copy of the information carrying portions of the original. The copy will thus result in a blank reflectance across the board, whereby the information carried on the original will have vanished on the copy.

As a further observation, we note that among the three cases I, II and III, in case I, the color contrast for 11 and 12 relative to the background is the strongest on the original and the printing process is the simplest as well, since 11 and 12 can be printed over an essentially white background. The contrast of the information on the original decreases as we move to the configurations of case II and case III.

The optical characteristic of the original document having been determined as per the prescription given above, it is pretty well guaranteed that the color copy will result in a blank. However, I have considered the possibility of having in the worst case some trace of the original information picked up by the copier due to a deviation in the modulation depth of the spectral characteristics of the original from the range prescribed by the present invention. I have thus considered that a second special but non-optical and therefore, unreproducible characteristic be imparted to the original. This is chosen to be a special chemical characteristic. In this case, when the copy shows an easily perceptible optical deviation from the original document, a final and definitive chemical verification is performed on the suspected copy. The latter undoubtedly fails to respond to this chemical verification and thereby allows the clear identification of the original from the copy.

The chemical characteristic utilized for identification must be easily conveyed to the inks used in the printing of the original document, and also it must be easily identifiable as being present on the original and absent on the copy.

In accordance with the invention, I have chosen to introduce in the printing medium, for example printing inks, a small percentage, typically 2 to 10% of either a color former leuco dye or an activator phenolic resin, which can be dissolved in the solvent vehicle or suspended in water based inks and thus be conveyed to the printed information portions of the original document. Clearly the color copied document will contain no trace of such chemicals. The chemical verification process consists in applying to the document the complimentary chemical, i.e. when the printing ink contains the activator, the verification is performed with a color former leuco dye carrying applicator. On the other hand, when the printing ink is prepared with the addition of a color former, the verification is performed with an activator carrying applicator. Examples of such leucodyes are: Copikem 14, Copikem Magenta, Copikem 6, Copikem 4 made by Hilton-Davis, Pergascript Orange I-5R, Pergascript Red I-6B, Pergascript Green I-3G, Pergascript Yellow I-3R made by Ciga-Geigy, Reakt Red 448, Reakt Yellow 186 made by BASF, either alone or in combination.

Examples of such activating phenolic resins are: Zincated, modified alkyphenol activator HRJ. - 10138; the Alkylphenol Novolac resin activator HRJ-2609 as made by Schenectady Chemicals Inc.; the chemical zinc chloride $ZnCl_2$, either alone or in combination.

The verification process will result in a highly visible color change of the information portion when color former leuco dyes meet the activator on the original, while in the fraudulent copy, the application of either a leucodye or the activator though an applicator will leave the copy inert.

After the substrate, such as paper or the like, has the background and contrast colors applied thereto by printing or the like, textual matter can be printed thereon in another color such as black.

In use, if the substrate has been duplicated in a color copier, there will be a clear indication of this copying, due to the fact that the contrast between the contrast color and the background color will have been reduced to zero on the copy. The user can verify that the copy is not an original by the second step of the chemical verification. It is clear that other types of verification as a second step can be used within the context of the present invention.

The invention presented above provides a clearly defined identification process to separate originals from counterfeits. The person skilled in this art can easily develop various ways of implementing this invention, which are considered to be within the scope of the present invention.

What is claimed is:

1. A security substrate for protecting against duplication with a color copier; comprising:

a main surface;

a background color on the main surface having an average reflectance value; and a contrast color on the background color having a spectral characteristic which modulates the average reflectance value by no moret han 5% and has an average reflectance equal to the average reflectance value, wherein the contrast color is composed of a printing medium including one from the group consisting of a color former leuco dye and an activating phenolic resin.

2. A method for protecting against duplication with a color copier; comprising the steps of:

providing a background color on a substrate having an average reflectance value; and printing on the background color with a contrast color having a spectral characteristic which modulates the average reflectance value by no more than 5% and has an average value equal to the average reflectance value, wherein the step of printing the contrast color comprises printing with a printing medium including one from the group consisting of a color former leuco dye and an activating phenolic resin.

* * * * *